United States Patent Office 3,048,472
Patented Aug. 7, 1962

3,048,472
PROCESS FOR THE CONVERSION OF ACID SLUDGE INTO SULFUR DIOXIDE AND HYDROCARBONS
Bela Karsay, Flushing, N.Y., assignor to Allied Chemical Corporation, New York, N.Y., a corporation of New York
No Drawing. Filed Apr. 27, 1959, Ser. No. 808,949
Claims priority, application Germany May 5, 1958
3 Claims. (Cl. 23—177)

The present invention relates to the regeneration of acid sludge containing a high concentration of sulfuric acid and is particularly directed to regeneration of 70–90% sulfuric acid contaminated by organic matters obtained in large quantities from the alkylation process of the petroleum industry, a special process for the production of high octane gasoline. In copending application Serial No. 773,588, filed November 13, 1958, is described a process for the regeneration of acid sludges. The present application is particularly directed to the treatment of the acid sludges containing a high concentration of sulfuric acid.

The sulfuric acid which is used as a catalyst in the alkylation process originally has a concentration of 98–100% but as a result of dilution caused by acid-soluble unsaturated hydrocarbons and water, it decreases during the reaction. Parallel with it, the reaction velocity of the alkylation also decreases. In order to keep the acid concentration constantly at about 90% level, 98–100% fresh acid is fed into the alkylation apparatus and used acid is withdrawn. Because the utilization of the used, about 88–90%, acid is an important economical problem of the alkylation process it will be regenerated in most refineries.

The task of regenerating this relatively concentrated sulfuric acid consists substantially of the removal of the organic impurities and the reconcentration of the purified acid. Different means are employed in the plants for this task.

According to one of the processes, the acid sludge obtained from the alkylation process is diluted to about 50% by which it is separated from the oil quantitatively. Then this dilute acid is concentrated by expensive methods. In order to make this process economical, large refineries work in such a manner that the 90% sulfuric acid withdrawn from the alkylation will be used in a series of other processes which require a less concentrated acid. By this method the sulfuric acid will be regenerated when it is exhausted to a concentration of about 65–75%.

According to other processes, the acid sludge is thermally decomposed at a temperature of 900–1200° C. (1650–2190° F.). Because the amount of the organic impurities present in acid sludge of the alkylation process is not high enough to maintain the decomposition process, the use of artificially introduced fuel is necessary. The disadvantage of these processes is that they produce a diluted sulfur dioxide containing carbon dioxide and carbon monoxide, which impurities are troublesome in the conversion of $SO_2$.

In another process, the acid sludge will be sprayed into the hot space of a rotary kiln in which a glowing coke bed furnishes the heat to the decomposition.

Every sulfuric acid regeneration process—which operates with thermal decomposition—has the common disadvantage that they operate at a very high temperature and consume large amounts of fuels.

In accordance with the present invention the regeneration of relatively concentrated sludge sulfuric acids is based on dehydrogenation reactions of naphthene and naphtheno-aromatic hydrocarbons by which the hydrogen necessary for the reduction of sulfuric acid will be furnished. As known, the naphthene hydrocarbons (also called cyclo-paraffines) have the same structure as the aromatic hydrocarbons, but they differ from them having one atom of hydrogen more on each carbon atom than the corresponding aromatic hydrocarbons.

As can be seen from the examples of the cyclohexane and decalin (decahydronaphthalene), the naphthenic hydrocarbons are inclined to lose hydrogen atoms—at suitable temperatures—and to turn into aromatic hydrocarbons:

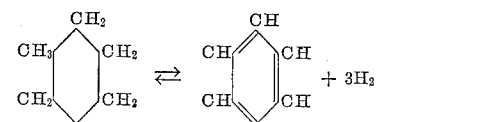

Cyclohexane     Benzene     (1)

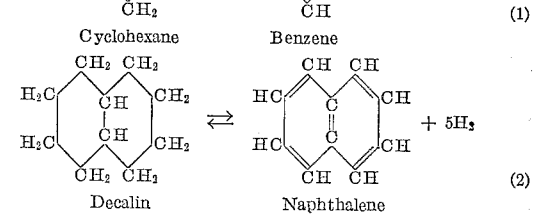

Decalin     Naphthalene     (2)

The naphtheno-aromatic hydrocarbons—which represent a transition between the aromatic and naphthenic hydrocarbons—behave similarly, as can be seen from the example of the tetralin (tetrahydronaphthalene):

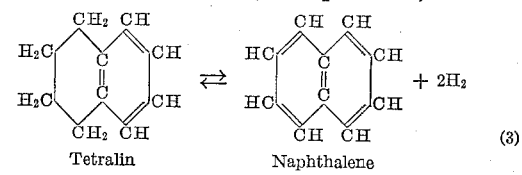

Tetralin     Naphthalene     (3)

An important characteristic of the process of the present invention is that the outlined reduction and dehydrogenation reactions take place parallel and lead—after the removal of the aromatic hydrocarbons and water formed—to a sulfur dioxide gas with a concentration of nearly 100% which can either be liquified, or after diluting by air converted into sulfuric acid in the usual way.

The course of the basic reactions of the present process can be outlined by the equations:

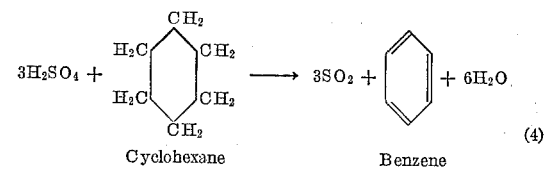

Cyclohexane     Benzene     (4)

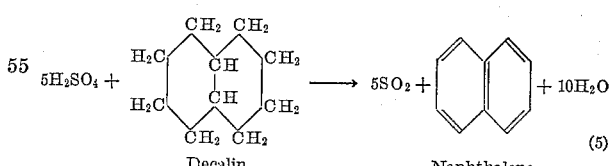

Decalin     Naphthalene     (5)

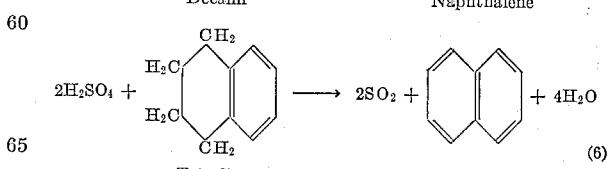

Tetralin     Naphthalene     (6)

The advantages of the invention in comparison with the known regeneration processes are:

(a) It operates at a lower temperature interval (between 120 and 550° C.=248 and 1020° F.);
(b) Such organic reducing agents are used, which are not destroyed during the reaction, but transformed into a more valuable form;

(c) The sulfur dioxide is obtained in a high concentrated form; and (d) The organic impurities of the sludge acids can be recovered separately from the other products.

The process of the present invention, therefore, differs basically from the above-mentioned known processes used in the commercial regeneration of relatively concentrated sludge sulfuric acids contaminated by organic matter.

The present process is principally carried out in such a manner that the sulfuric acid sludge preheated to the suitable temperature is thoroughly mixed—in a closed space, in state of finely divided liquid or vapor—with the preheated liquid or vaporized hydrocarbon, and kept on the reaction temperature until the dehydrogenation and reduction reactions take place quantitatively. The sulfur dioxide obtained is separated from the aromatic hydrocarbons and water formed, for example by cooling.

The sulfuric acid sludge is heated in a pipe still most advantageously. The temperature to which the sulfuric acid must be heated depends on the dehydrogenation stability of the used naphthenic—and/or naphtheno-aromatic hydrocarbons. It generally lies between 180–600° C. (356–1112° F.); a low temperature operation would be within the range of 180–300° C. and a higher temperature operation would be between 300–450° C. At this temperature the sulfuric acid is partly or entirely in dissociated form and has a strong dehydrogenating effect on the hydrocarbons. The sludge acid is gradually heated to the reaction temperature. At an intermediate temperature—which is determined by the properties of the organic impurities—it is introduced into an evaporator where it is separated from the greatest part of the impurities. After this treatment it is guided back into the pipe still and heated to the desired end temperature.

In another pipe still, the naphthene or/and naphtheno-aromatic hydrocarbon will be heated to the dehydrogenation temperature. This temperature depends on the properties and stability of the hydrocarbon in question, and lies between 120–550° C. (248–1022° F); a low temperature operation would be within the range of 180–300° C. and a higher temperature operation would be between 300–450° C. The dehydrogenation reaction takes place with a useful velocity in this temperature interval, but the ring structure of the hydrocarbon will not be destroyed. The mixing of the preheated reaction components is carried out inside an injector which is installed in the inlet tube of the first reaction tower. The ratio of the components of the reaction is set in such a manner that the quantitative decomposition of the sulfuric acid is assured by this, generally a hydrocarbon surplus of about 10–20% will be adequate.

The hot vapors of the reaction mixture are blown tangential into the first reaction tower and generally led through two towers. The reaction mixture, which leaves the second tower, consists of sulfur dioxide, water vapor, vapors of the aromatic hydrocarbons formed and eventually the vapors of the organic impurities of the acid sludge which are not removed. In order to separate these components from each other the reaction mixture is led through a heat exchanger into a cooler system and cooled to room temperature. The sulfur dioxide gas which at room temperature contains a small amount of water and hydrocarbon vapor can be scrubbed before further processing by a heavy hydrocarbon and dried by concentrated sulfuric acid in order to obtain it in a concentrated form. The sulfur dioxide obtained in this way is suitable for liquefaction or—after diluting by air—for production of sulfuric acid or oleum. The aromatic hydrocarbon obtained from the naphthene and/or naphtheno-aromatic hydrocarbon can be separated from water by a single decantation. The original organic impurities of the sulfuric acid sludge which are the heaviest component of the reaction mixture can be condensed first in the course of the cooling and obtained after the heat exchanger.

An important feature of the process of the invention is that the reduction of sulfuric acid can be carried out not only with individual naphthenic and/or naphtheno-aromatic hydrocarbons which are expensive and heavily accessible, but also with fractions of the petroleum and tar industry which contain these compounds in sufficient quantity. Such fractions consist generally of naphthene and/or naphtheno-aromatic hydrocarbons besides aromatic and paraffinic hydrocarbons. But, among the reaction circumstances of the process, the sulfuric acid reacts only with the naphthene and/or naphtheno-aromatic hydrocarbons of the fractions in question. Most advantageously, easily accessible gasoline and kerosene fractions of naphthene-basic crude oils can be used as reducing agents, but also by-products of the petroleum industry such as extracts of the selective solvent treatment can be utilized.

The performance of the present process changes to a certain degree from product to product, but its fundamental principle, namely the transformation of naphthene and/or naphtheno-aromatic hydrocarbons by dehydrogenation, and the reduction of sulfuric acid connected with it remains unaltered. The result of the reaction is the enrichment of the aromatic hydrocarbons, by which the products used are transformed to rich sources of aromatic compounds. For example, from gasoline fractions, benzene and its derivatives can be produced; from kerosene fractions, naphthalene and its derivatives, from solvent extracts and acid sludges, polycyclic aromatic compounds can be recovered. This latter can be further decomposed thermally and transformed to lower aromatic hydrocarbons.

The light fractions of oils and tars may be dehydrogenated in vapor or gas phase similar to individual naphthene and/or naphtheno-aromatic hydrocarbons. Namely, in the manner that they are heated to the temperature of reaction in a pipe still and then mixed with the vapors of the sulfuric acid. The high molecular polycyclic naphtheno-aromatic compounds, which cannot be evaporated without decomposition, may be dehydrogenated either at lower temperatures in liquid phase, without destruction of their ring structure, or they may be submitted to a destructive dehydrogenation and then polycyclic aromatic hydrocarbons obtained can be thermally decomposed in a separate operation.

The first reaction can be carried out in such a manner that the product (for example a solvent extract) is heated to a temperature of about 300–450° C. (570–840° F.) and mixed with sulfuric acid vapor in an injector and blown into the reaction tower. The destructive dehydrogenation can be carried out in a way that the product is heated to a higher temperature (to about 450–550° C. to 840–1020° F.) and mixed with preheated sulfuric acid vapors to the same temperature. At this temperature the dehydrogenation and thermal decomposition of the high molecular polycyclic naphtheno-aromatic hydrocarbons takes place simultaneously. Also, the sulfuric acid of the acid sludges, obtained in the sulfuric acid treatment of petroleum and tar products, can be regenerated by the present process. The acid sludges consist substantially of free sulfuric acid and high molecular polycyclic naphtheno-aromatic hydrocarbons, i.e. their sulfonic acids dissolved in it. Because the ratio of both components of the reaction generally does not correspond with the stoichiometric, it must be set by addition of sulfuric acid or naphtheno-aromatic hydrocarbons, taking into consideration that a surplus of hydrocarbon is necessary for the quantitative decomposition of sulfuric acid.

The heating of the acid sludges to the reaction temperature can be carried out but in an indirect way because they are very viscous liquids and are inclined to form coke. They are preheated to a temperature of about 80–120° C. (176–250° F.) and sprayed in a fine state of dispersion into a liquid preheated to the temperature of decomposition of acid sludge. This liquid, which acts as a heat-transferring agent, can be of organic and inorganic origin. As organic heat-transferring agents, high boiling point petroleum and tar products can be used. At the same time, they can act as separating liquids because they are able to dissolve the aromatic hydrocarbons formed during the dehydrogenation reaction and separate them from the still undecomposed sulfonic acids and free sulfuric acid. As inorganic heat-transferring agents, concentrated solutions or melts of different salts, for the best of sulfates, can be used. Also, these can act as separating liquids when their specific gravities lie between the specific gravities of the aromatic compounds obtained and the undecomposed sulfonic acids.

The regeneration temperature of acid sludges lies, most advantageously, between 180–230° C. (356–446° F.). At this temperature interval not only desulfonation and reduction reaction but also dehydrogenation reactions of high molecular polycyclic compounds take place with suitable velocities. The products of the decomposition of the acid sludges are: highly concentrated sulfur dioxide and a mixture of high molecular polycyclic aromatic compounds. This latter can be further decomposed in order to produce basic aromatic compounds.

The following example may serve as the illustration of the process:

The sludge acid of an alkylation process, which has a titratable concentration of 90% and contains 6% organic impurities and 4% water, is heated in a pipe still to a temperature of about 420–440° C. (788–824° F.). The organic matter used as the reducing agent of the sulfuric acid sludge, namely a fraction of a Californian (Hountington Beach) gasoline was heated in another pipe still to about 400–440° C. (750–824° F.). The components were mixed together in an injector and blown under atmospheric pressure tangentially into the reaction tower. A naphthene-hydrocarbon surplus of about 10% was used. The reaction mixture passed two reaction towers coupled in series and then got to a cooling system where it was cooled to room temperature. The sludge sulfuric acid was transformed into concentrated sulfur dioxide with a recovery about 94%.

The analytical data of the gasoline fraction used before and after the reaction is as follows:

| | Before | After |
|---|---|---|
| Boiling interval | 60–150° C. (140–302° F.) | 65–162° C. (149–324° F.) |
| Specific gravity at 20° C | 0.738 | 0.776 |
| Composition: | | |
| Naphthene hydrocarbons, percent | 48 | 5 |
| Aromatic hydrocarbons, percent | 7 | 50 |
| Paraffinic hydrocarbons, percent | 45 | 45 |
| Octane number | 42 | 59 |

I claim:
1. A process for the regeneration of sulfuric acid sludge having a sulfuric acid concentration of at least 70% to about 90% $H_2SO_4$ and contaminated by organic matter to produce concentrated sulfur dioxide gas and concomitantly converting naphthenic hydrocarbons into valuable aromatic hydrocarbons which comprises heating a separate stream of concentrated sulfuric acid sludge to a temperature of 572–842° F., heating another separate stream of hydrocarbons containing at least about 45% by weight naphthenic hydrocarbons selected from the group consisting of naphthene hydrocarbons and naphtheno-aromatic hydrocarbons to a temperature of 572–842° F., the total naphthene and naphtheno-aromatic hydrocarbons in said stream being at least about 10% in excess of that required for quantitative decomposition of the sulfuric acid content of the sludge, commingling and discharging the two separate heated streams of concentrated sulfuric acid sludge and naphthenic hydrocarbons into an enlarged reaction zone, maintaining the vaporized mixture of concentrated acid sludge and naphthenic hydrocarbons in said reaction zone to convert the sulfuric acid by substantially only reaction with the naphthenic hydrocarbons to sulfur dioxide while simultaneously converting at least 85% of the naphthenic hydrocarbons to unsulfonated aromatic hydrocarbons, withdrawing from the reaction zone the vaporized organic impurities of the sludge and the reaction products containing sulfur dioxide, water vapor and aromatic hydrocarbons, cooling in a first cooling zone to condense the organic impurities of the sludge, further cooling in a second cooling zone to condense the water vapor and aromatic hydrocarbons as liquid bodies, releasing the non-condensed sulfur dioxide from the liquid bodies of water and aromatic hydrocarbons, and discharging the aromatic hydrocarbons.

2. A process for the regeneration of sulfuric acid sludge having a sulfuric acid concentration of at least 70% to about 90% $H_2SO_4$ and contaminated by organic matter to produce concentrated sulfur dioxide gas and concomitantly converting naphthenic hydrocarbons into valuable aromatic hydrocarbons which comprises heating a separate stream of concentrated sulfuric acid sludge to a temperature of 572–842° F., heating another separate stream of hydrocarbons containing at least about 45% by weight of naphthene hydrocarbons to a temperature of 572–842° F., the total naphthene hydrocarbons in said stream being at least about 10% in excess of that required for quantitative decomposition of the sulfuric acid content of the sludge, commingling and discharging the two separate heated streams of concentrated sulfuric acid sludge and naphthene hydrocarbons into an enlarged reaction zone, maintaining the vaporized mixture of concentrated acid sludge and naphthene hydrocarbons in said reaction zone to convert the sulfuric acid by substantially only reaction with the naphthene hydrocarbons to sulfur dioxide while simultaneously converting at least 85% of the naphthene hydrocarbons to unsulfonated aromatic hydrocarbons, withdrawing from the reaction zone the vaporized organic impurities of the sludge and the reaction products containing sulfur dioxide, water vapor and aromatic hydrocarbons, cooling in a first cooling zone to condense the organic impurities of the sludge, further cooling in a second cooling zone to condense the water vapor and aromatic hydrocarbons as liquid bodies, releasing the non-condensed sulfur dioxide from the liquid bodies of water and aromatic hydrocarbons, and discharging the aromatic hydrocarbons.

3. A process for the regeneration of sulfuric acid sludge having a sulfuric acid concentration of at least 70% to about 90% $H_2SO_4$ and contaminated by organic matter to produce concentrated sulfur dioxide gas and concomitantly converting naphthenic hydrocarbons into valuable aromatic hydrocarbons which comprises heating a separate stream of concentrated sulfuric acid sludge to a temperature of 572–842° F., heating another separate stream of hydrocarbons containing at least about 45% by weight of naphtheno-aromatic hydrocarbons to a temperature of 572–842° F., the total naphtheno-aromatic hydrocarbons in said stream being at least about 10% in excess of that required for quantitative decomposition of the sulfuric acid content of the sludge, commingling and discharging the two separate heated streams of concentrated sulfuric acid sludge and naphtheno-aromatic hydrocarbons into an enlarged reaction zone, maintaining the vaporized mixture of concentrated acid sludge and naphtheno-aromatic hydrocarbons in said reaction zone to convert the sulfuric acid by substantially only reaction with the naphtheno-aromatic hydrocarbons to sulfur dioxide while simultaneously converting at least 85% of the naphtheno-aromatic hydrocarbons to unsulfonated aromatic hydrocarbons, withdrawing from the reaction zone the vaporized organic impurities of the sludge and the reaction products containing sulfur dioxide, water vapor and aromatic hydrocarbons, cooling in a first cooling zone to condense the organic impurities of the sludge, further cooling in a second cooling zone to condense the water vapor and aromatic hydrocarbons as liquid bodies, releasing the non-condensed sulfur dioxide from the liquid bodies of water and aromatic hydrocarbons, and discharging the aromatic hydrocarbons.

References Cited in the file of this patent

UNITED STATES PATENTS

| | | |
|---|---|---|
| 2,064,549 | Lauer et al. | Dec. 15, 1936 |
| 2,155,200 | Merriam | Apr. 18, 1939 |
| 2,435,710 | Collier et al. | Feb. 10, 1948 |

OTHER REFERENCES

Rossini et al.: "Hydrocarbons From Petroleum," Reinhold Publishing Corp., copyright 1953, pages 161 to 166 (164 of special interest).

Gruse et al.: "Chemical Technology of Petroleum," McGraw-Hill Book Co.; 1942, 2nd Edition, page 294.